A. M. NICHOLAS.
APPARATUS FOR SEPARATING LIQUIDS FROM SOLIDS.
APPLICATION FILED NOV. 24, 1916.

1,268,274.

Patented June 4, 1918.
3 SHEETS—SHEET 1.

A. M. Nicholas.
Inventor.

By Albert H. Parker
Attorney.

A. M. NICHOLAS.
APPARATUS FOR SEPARATING LIQUIDS FROM SOLIDS.
APPLICATION FILED NOV. 24, 1916.
1,268,274.
Patented June 4, 1918.
3 SHEETS—SHEET 2.
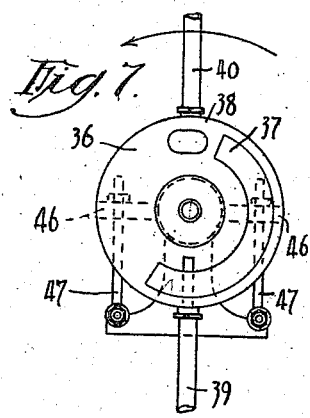
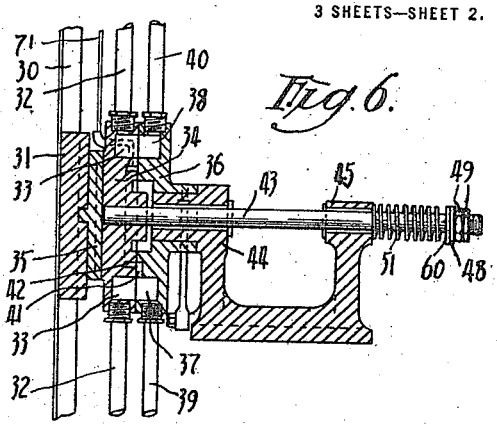
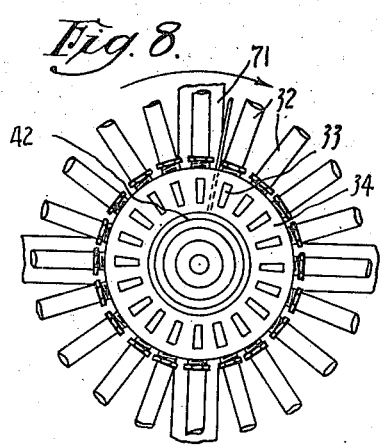
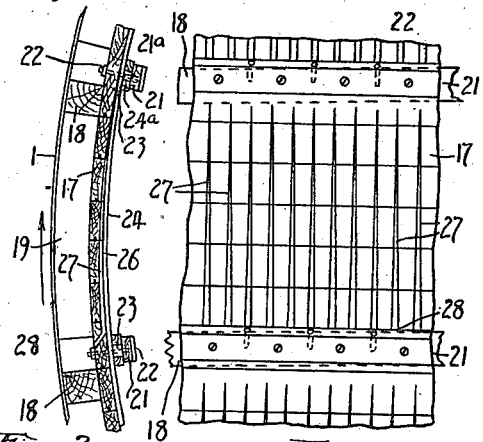
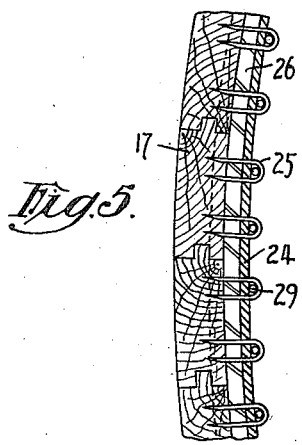
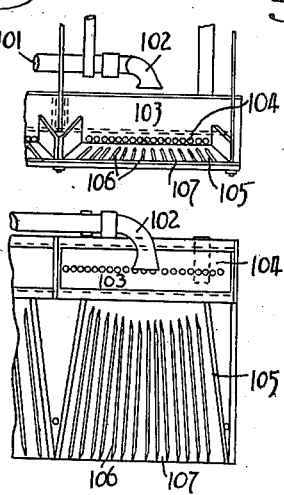
A. M. Nicholas
Inventor.
By
Attorney.

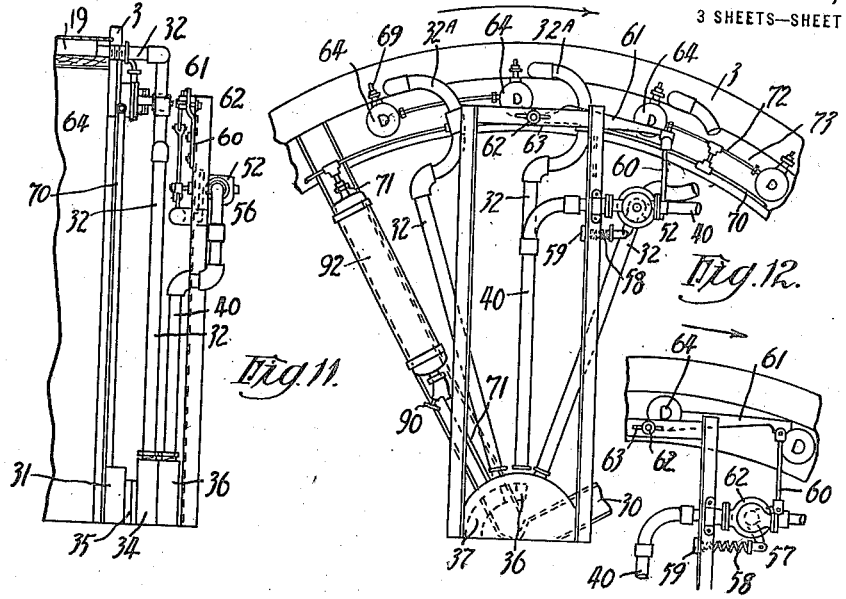
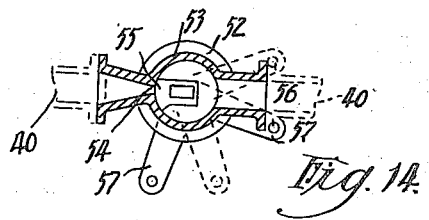
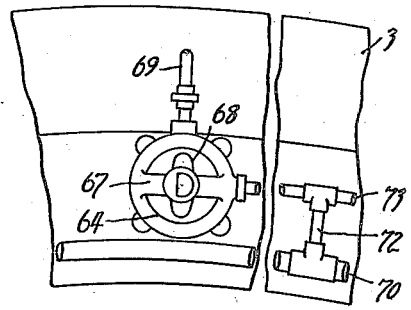
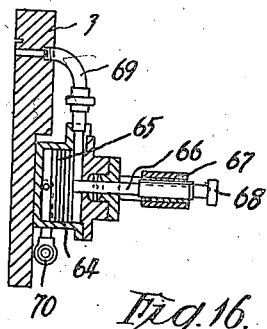
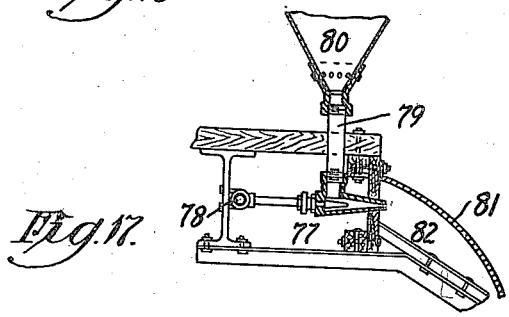

UNITED STATES PATENT OFFICE.

ASKIN MORRISON NICHOLAS, OF TORRINGTON, BISMUTH, VIA DEEPWATER, NEW SOUTH WALES, AUSTRALIA.

APPARATUS FOR SEPARATING LIQUIDS FROM SOLIDS.

1,268,274.  Specification of Letters Patent.  Patented June 4, 1918.

Application filed November 24, 1916. Serial No. 133,117.

*To all whom it may concern:*

Be it known that I, ASKIN MORRISON NICHOLAS, a subject of the King of Great Britain, residing at Block 14, Torrington, Bismuth, via Deepwater, in the State of New South Wales, Australia, have invented certain new and useful Improvements in Apparatus for Separating Liquids from Solids, and I do declare the following to be a full, clear, and exact description of the invention, such as will enable others skilled in the art to which it appertains to make and use the same.

This invention relates to an improved apparatus for the separating of liquids from solids, which may be used for the filtration of slimes, concentrates and other finely divided solids and for the removal of sugar juice from megass, and so on.

The apparatus hitherto known for effecting filtration of slimes, concentrates and other granular and finely divided solids are restricted in the scope of their operations and consist of devices in which the filtering medium is immersed in a separate tank or bath containing the matter to be treated, which has to be kept in a state of agitation during which time a vacuum behind that portion of the filtering medium that is submerged causes some of the liquid to pass through and the residue to be held on the outer surface until it is removed the desired distance from the bath when the vacuum is broken and the material removed by suitable means. The apparatus hitherto in use are subject to the disadvantage that the heavier portions of the solids suspended in the aggregate tend to drop to the bottom of the tank, so that the drawing action exerted on the filtering medium tends to take up, in the first instance at least, the finer and more adhesive solids whereby the filtering medium tends to become clogged, and, in order that the heavier and coarser material also shall be subjected to the drawing action, it is usually necessary to stir or agitate the liquid in the tank. Such agitation, however, does not completely effect its purpose, and the filtering medium always tends to collect first the finer and more adhesive portions, whereby not only is the subsequent filtration rendered slow, but also the after process of removal of the coating of solids from the filtering medium is caused to be difficult and incomplete.

According to the present invention I provide an improved apparatus whereby no extraneous tank or bath is required to hold the aggregate, as such aggregate rests on the separating medium which is on the inside of a cylinder or drum and the heavier portions of the aggregate, by the action of gravitation, are deposited first on the separating medium and so tend to keep it in good working condition.

Furthermore my improved apparatus readily and efficiently clears the separating medium of the residue attracted by the vacuum and discharges same by means of a sudden blast of air in the compartment in which a vacuum previously existed.

For facilitating the discharge of the separated liquid from my machine the bulkheads or watertight partitions between the compartments are placed helically or obliquely to the axis of the cylinder or drum and the air and vacuum pipes are connected to a circular valve on the axis, while an arrangement near the periphery at one end controls the blasts of air in the different compartments.

In the treatment of some materials, which would clog, I increase the efficiency of the separating medium and also facilitate the removal of the residue by coating the receiving surface of the medium with a coarse sharp granular or other suitable material immediately before the aggregate is approached.

In order that my invention may be clearly understood, I will now describe it with the aid of the accompanying drawings, in which—

Figure 1:
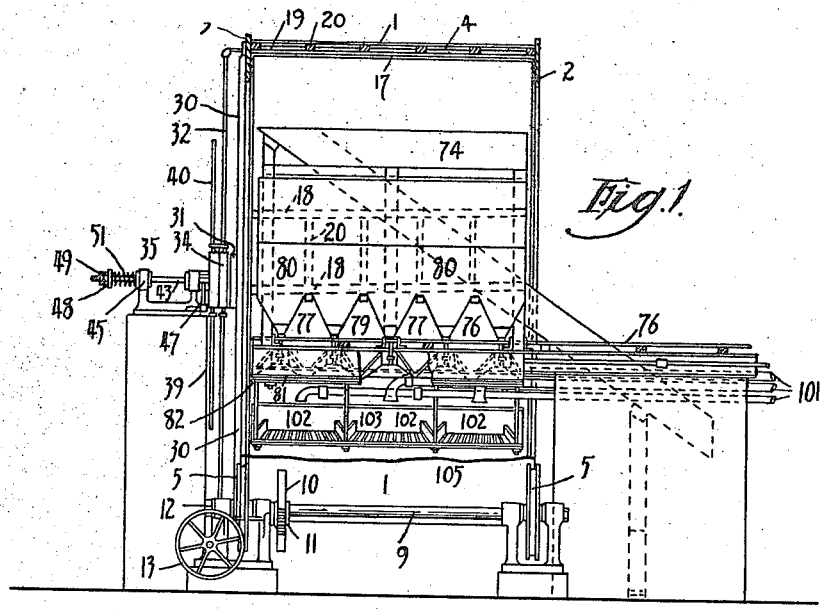
Figure 1 is a transverse sectional elevation (part in elevation) of my apparatus.

Figs. 3, 4, and 5 show portions of the rim of the machine.

Figs. 6, 7 and 8 are detailed views of the circular valve and attendant parts.

Figs. 9 and 10 are respectively elevation and plan of means for delivering the mixture into the machine.

Figs. 11, 12 and 13 represent views of the pipe connections, etc.

Fig. 14 is a sectional elevation of the trip valve.

Figs. 15 and 16 are elevation and sectional elevation of the controlling cylinder and piston, and Fig. 17 represents means for applying a coating of granular or other material to the separating medium.

As will be seen the machine consists of a cylinder or drum rotatable on rimmed or flanged bearing rollers or trundle wheels, 5, one pair of which transmit the rotary motion to the cylinder or drum by friction due to the weight of the latter. The machine is driven by belt pulley 13, gear wheels, 10, 11 and worm drive 12, as shown in the drawings, or as found most convenient. The rollers 5 are carried in bearings 14 one set of the latter being slidable on rails 15 and adjustable as to position by the screw 16.

Figure 2:
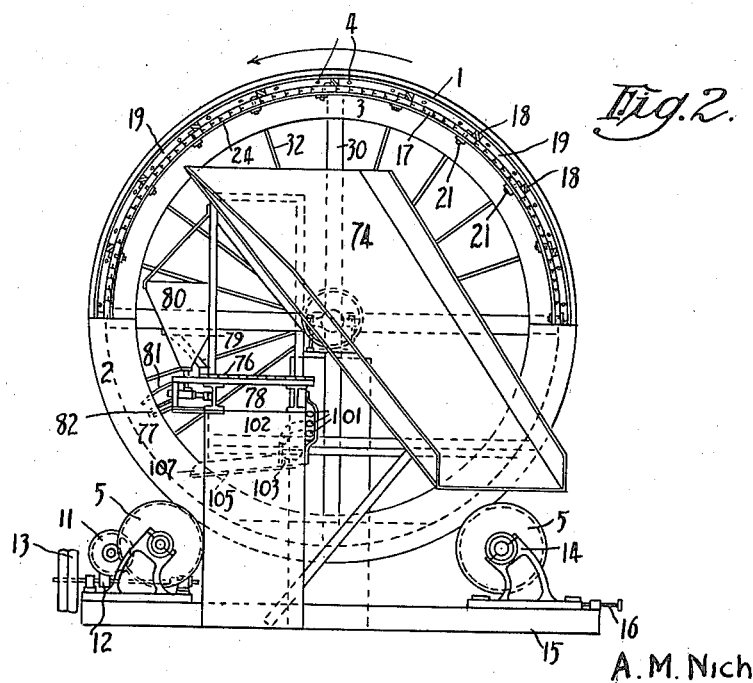
Fig. 2 is a front elevation (part in section).

As shown, in Figs. 1 and 2, the cylinder or drum consists of a cylindrical shell 1 preferably of metal, an inner shell 17 of smaller diameter, of wood, concentrically placed, the annular space between them being divided up into a number of compartments by bulkheads or watertight partitions 18 placed helically or slightly inclined in the length to the axis of the wheel as shown by dotted lines in Figs. 1 and 4 and full lines in Fig. 3 and fastened to both shells. The ends of the compartments 19 are closed by the annular plates 2 and 3 secured by the through bolts 4. The compartments are strengthened against external pressure by ribs 20 (Fig. 1). The construction of the cylinder or drum is such that the separating medium hereinafter described and annular plates 2 and 3 form a continuous container on the inside to temporarily hold at the bottom or lowest portion thereof the aggregate while being acted upon. The inner surface of the wooden shell 17 is provided with taper grooves 27 terminating in a transverse gutter at the trailing end having drain holes 28 leading to the corresponding compartment 19.

Over these grooves is laid, in sections, screens 26 of suitable metal, expanded, perforated or otherwise formed between bars 23, and over the metal screens 26 is laid the separating medium 24, which may be of cloth, felt, coir matting or other suitable filtering material or combination of materials and which is secured against the screens 26 on the wooden shell 17 in such manner as to reduce to a minimum any tendency on the part of the separating medium 24 to distend, as by wires, 29, screening, netting and the like, the whole being secured by staples 25. The bars 23 and battens 21 are secured by bolts 22. The edges of the screens 26 and separating medium 24 are secured under the battens 23 by gaskets 21ᵃ driven or wedged in tight.

In the drawings I have shown twenty distinct compartments 19 each having an inner porous wall as just described, but otherwise watertight; the number of compartments may however be varied as desired. The liquid passing through the porous wall is drained off by suction through the grooves 27, drain holes 28, pipes 32, ports 33 and 37 of the circular valve 34, 36 and pipe 39 to the pump, not shown. The circular valves 34, 36, as shown in Figs. 6, 7, 8 consist of the valve seat 36 carried by the bearing 44, and the valve 34 carried on the shaft 43 (rotatable in the bearings 44, 45) and kept up against the seat 36 by the spring 51 acting against the washers 48 and 50 and nuts 49. The valve is flexibly connected at 35 to, or driven from, the boss 31, carried by the spokes or arms 30 secured to the cylinder or drum. In the valve seat 36 are the vacuum port 37 (from which leads the pipe 39), the vacuum port 41 (forming communication between the port 37 and the annular port 42 in the valve 34) and the air port 38 (from which leads the pipe 40). In the valve 34 there are as many ports 33 as compartments 19 in the drum. The path of these ports 33 is coincident with the ports 37, 38 in the seat 36 and from them lead the pipes 32. The making or breaking of the vacuum in the compartments 19 is advanced or retarded as required by the circumferential adjustment of seat 36 by lugs 46 thereon and bolts and nuts 47 provided for the purpose. The pipes 32 are constructed with a bend at 32ᵃ (Fig. 12) so as to give a certain amount of elasticity and provide for any irregularities in the movement of the drum. Valve seats 36 having longer or shorter ports 37, 38 may be provided according to the nature of the aggregate being treated.

Compressed air is supplied from a compressor (not shown) through the pipe 40 (fitted with a trip valve 52 arranged to be operated at the proper time) circular valve 34, 36 and pipes 32. This valve 52 consists of a shell 53 having a port 54, and contains an oscillating valve 55 to the stem 56 of which is secured the bell crank 57. One arm of this bell crank 57 is actuated by a spring 58 butting against the fixed stop 59 while the other is connected as by the link 60 to the free end of cam lever 61 which is pivoted at its other end on the pin 62 adjustable in the direction of the length of the cam by means of the slot 63.

When it is desired to remove the residue held against the separating medium 24 a sudden blast of air is delivered into the respective compartment 19 by the aid of the following mechanism:

Conveniently placed in relation to each compartment 19 and rotatable with the cylinder or drum is a controller in the form of a cylinder 64 fitted with a piston 65 having a rod 66 with a head 68 projecting normally so that in their circumferential travel each head 68 alternately actuates and releases the cam lever 61; the outer end of the rod 66 is supported in the bracket 67. The outer end of each cylinder 64 is in communication with the corresponding compartment 19 by the pipe 69 and the inner end is maintained under a determined degree of vacuum, being connected by the branch pipes, 73, 72, annular pipe 70, radial pipe 71 leading to the annular port 42 in the valve 34, and thence by the ports 41, and 37, and the pipe 39 with vacuum pump not shown. A vacuum chamber 92 is provided in the pipe 71 and a needle valve 90 is fitted for controlling the vacuum.

The following means are provided by which the aggregate is conducted to the container formed at the lower portion of the drum by the separating medium 24 and annular plates 2 and 3: Conveniently situated are the pipes 101 (Figs. 1, 2, 9 and 10) and faucets 102 leading on to the trough or launder 103 placed transversely in the drum and communicating through holes 104 therein with the apron 105 having riffles 106 on the upper surface. The delivery edge 107 is situated so as to deliver on to the separating medium 24 approximately as shown in the drawings.

In order, in certain cases, to reduce the tendency of the separating medium 24 to become clogged and to facilitate the removal of the residue, I may, if necessary, provide means for applying a coacting of dry sand or other granular or other suitable material on the separating medium 24. These means consist of an air injector 77 connected by the pipe 78 with the source of air supply, as shown in Fig. 17. This injector is adapted to draw the dry sand or other granular or suitable material through the pipe 79 from the hoppers 80 and deliver it against the baffle plate 81. The baffle plate 81 delivers on to the separating medium 24 above the point at which the aggregate is delivered. The guard plate 82 is fitted to insure that the dry sand or other material shall be applied to the filtering medium precisely where required.

An overhung frame and platform 76 is provided for the purpose of carrying the stationary portions of the machine within the cylinder or drum and on it the operator stands when required to attend to the machine.

It will be understood that details of construction, which do not affect the essence of my invention, may be varied as desired according to the size of or use to which the machine is to be put. Furthermore the materials used in the construction of the machine will be such as will be found most suitable to the aggregate which is being treated.

The mode of operation is as follows:—

The machine having been set in motion, the aggregate to be treated is delivered through the pipes 101 and faucets 102 to the trough or launder 103 whence it is delivered through the holes 104 and aprons 105 as uniformly as possible over the edge 107 on to the separating medium 24, say at about 107 (Fig. 2). The machine may be constructed to be driven either with or against the clock and not necessarily as shown by the arrows. The aggregate as it is delivered on to the separating medium 24 travels therewith.

Vacuum is maintained in the compartments 19 beneath the aggregate by the vacuum pump through pipes 32, ports 33 and 37 and pipe 39 and in certain other compartments 19, so long as the respective ports 33 are in communication with port 37. The result is that the residue is drawn to and deposited on the separating medium and will be held there until such time as it is desired to remove same, while substantially all liquids extracted from the residue into the compartments 19 are subsequently withdrawn by the vacuum pump to be discharged where desired.

The rate of rotation of the cylinder or drum is such that the separation is substantially complete when the respective ports 33, 37 cease to be in communication with each other. Shortly after such communication has ceased, communication is established between the ports 38 and 33 in the circular valve 34, 36. As the head 68 of piston 65 has previously engaged and depressed the cam lever 61, and so closed the trip valve 55, air communication between the compartment 19 and compressor is, however, not yet established. At such time, too, a condition of vacuum still exists in the compartment 19, and being exerted on the front of the piston 65 in the cylinder 64 in excess of the constant vacuum maintained at the rear of the piston 65, the head 68 is prevented from being withdrawn from engagement with the cam-lever 61 and the valve 55 therefore remains closed, as shown by full lines in Fig. 14. When, however, by the influx of air through the residue and separating medium 24, the vacuum in the compartment 19 and in the front of the cylinder 64 becomes lower than that maintained in the rear of the cylinder 64, the piston 65, rod 66, and head 68 are forced back and the cam lever 61 thereby released and the valve 55 opened (as shown by dotted lines Fig. 14) under the action of the spring 58.

Air is thus allowed to enter suddenly into the compartment 19 giving a sharp impulse or jerk to the separating medium 24 and thereby causing the residue thereon to be jerked off into the tray or chute 74. Owing to the air being suddenly admitted, the removal of the residue is more readily effected and the consumption of compressed air is reduced to a minimum. If, owing to undue friction or other cause, the piston head 68 fails to be withdrawn, release of the cam lever 61 and opening of the valve 55 nevertheless take place as soon as the head 68 moves past the free end of the cam lever 61 (see Fig. 13).

Air communication is shortly after closed owing to the ports 33, 38 being moved out of coincidence. It will be understood that valve 55 which has been opened is closed again before each succeeding port 33 makes communication with port 38, as already described, and the same series of operations takes place in each succeeding compartment 19 as it comes into position.

By means of the needle valve 90 the vacuum maintained can be varied at will while the machine is running, and regulation is thereby effected of the timing of the valve 55 by controlling the movement of the piston 65 and consequent admission of compressed air to each of the compartments 19, at the time the vacuum therein has fallen to such a degree as is found to be consistent with the most efficient action of such compressed air in removing the residue from the separating medium 24.

The means of delivering the aggregate to the separating medium 24 and of removing the residue therefrom will vary according to the nature and condition of the aggregate to be treated. The form and construction of the ports shown in the drawings are adapted for the separation of slimes and similar aggregates and modification in the construction and position of the feed and delivery appliances would be made as required for dealing with other aggregates, such as, for instance, peat, megass and the like. In the case of peat, megass and the like aggregates, having little or no tendency to adhere to the separating medium, 24, the residue would be removed from the separating medium 24 before it reached the highest point and the chute 74 would be arranged in a suitable position for receiving it. One of the advantages of the rotary separator, which is the subject of this invention, is its ability to deal with materials having little or no tendency to adhere owing to the fact that they are retained on the separating medium in the lower part of the drum by gravitation, whereas in rotary separators with horizontal axes having an external separating medium, as hitherto constructed, such materials could not be retained on the separating medium in the lower part of the drum, owing to their adhesiveness being insufficient to counteract the effect of gravitation.

It will be apparent that my invention is especially suitable for de-watering the products of flotation processes.

I claim:—

1. A rotary separator, comprising a rotatable container, a filtering medium spaced from the interior surface of said container, means for dividing the space between said interior surface and said medium into separate compartments, means for bringing said compartments in succession under the action of suction and cutting off said compartments in succession from said suction after a predetermined period, and means for thereafter subjecting said compartments in succession to the action of a sudden fluid blast.

2. A rotary separator, comprising a rotatable container having a peripheral series of separate compartments each having apertures in the inner wall thereof, a filtering medium spaced from the inner wall of each compartment, means for delivering a mixture of liquid and solids upon said filtering medium, means for bringing said compartments in succession under the action of suction and cutting off said compartments in succession from said suction after a predetermined period, and means for thereafter subjecting said compartments in succession to the action of a sudden blast.

3. A rotary separator, comprising a rotatable container, a filtering medium spaced from the interior surface of said container, means for dividing the space between said interior surface and said medium into separate compartments, means for delivering a mixture of liquid and solids onto said filtering medium, means for subjecting said compartments in succession to the action of suction for a predetermined period, operating means on said container, one for each compartment, and means controlled by the successive operating means for suddenly admitting a fluid blast to said compartments in succession.

4. A rotary separator, comprising a rotatable container, a filtering medium spaced from the interior surface of said container, means for dividing the space between said interior surface and said medium into separate compartments, means for delivering a mixture of liquid and solids onto said filtering medium, means for subjecting said compartments in succession to the action of suction for a predetermined period and for then cuting off said suction, means controlling the introduction of pressure fluid to said compartments in succession, and means actuated by a predetermined pressure increase in the successive compartments for actuating the last mentioned means.

5. A rotary separator, comprising a rotatable container, a filtering medium spaced from the interior surface of said container, means for dividing the space between said interior surface and said medium into separate compartments, means for delivering a mixture of liquid and solids onto said filtering medium, valved means operating to subject said compartments in succession first to the action of suction and then to fluid pressure, operating means on the container, one for each compartment, and additional valved means controlled by the successive operating means for supplying pressure fluid to the first mentioned valved means.

6. A rotary separator, comprising a rotatable container, a filtering medium spaced from the interior surface of said container, means for dividing the space between said interior surface and said medium into separate compartments, means for delivering a mixture of liquid and solids onto said filtering medium, valved means operating to subject said compartments in succession to the action of suction for a predetermined period and then to cut off said suction, operating means associated with each compartment and operated by a predetermined increase of pressure therein, and additional valved means controlled by the successive operating means for admitting pressure fluid to said compartments in succession through the first mentioned valved means.

7. A rotary separator, comprising a rotary container consisting of an outer cylindrical shell and an inner cylindrical shell, means for dividing the annular space between said shells into a plurality of compartments, a filtering medium spaced from the inner shell, means for dividing the space between said medium and the inner shell into a plurality of compartments corresponding to the first series of compartments, apertures in said inner shell establishing communication between each pair of compartments at one end thereof, the remainder of the inner shell being imperforate, a plurality of grooves formed on the interior surface of said inner shell in each of the compartments between the shell and filtering medium, said grooves leading to said apertures, means for delivering a mixture of liquid and solids upon the said filtering medium and means for subjecting each pair of compartments in succession first to the action of suction and then to the action of a fluid blast.

8. A rotary separator comprising a hollow annulus having a filtering medium arranged on its inner side and spaced therefrom, means for subjecting said filtering medium to vacuum and air pressure, means for delivering upon the said filtering medium the material to be separated and means for depositing a layer of granular or other suitable material upon the said filtering medium in advance of the deposition of said material to be separated.

9. A rotary separator consisting of a wheel revolving on a practically horizontal axis and comprising a hollow annulus divided into segmental compartments fitted with a filtering medium on their inner sides, means for delivering the material to be filtered onto the filtering medium over suitable distributers, means for subjecting said compartments to vacuum, together with a trip-valve for admitting compressed air suddenly to each of said compartments in succession to said vacuum.

10. A rotary separator comprising a hollow annulus divided into segmental compartments, partitions between said compartments placed helically oblique to the axis of said annulus substantially as and for the purpose described.

11. A rotary separator comprising compartments covered with a filtering medium, means for obtaining a condition of vacuum in said compartments, an air reservoir, means for maintaining a vacuum in said reservoir of a lesser degree than that produced in said compartments, and a valve adapted to admit compressed air to each of said compartments when the vacuum therein bears a certain relation to that in said reservoir substantially as described.

12. A rotary separator comprising a compartment covered with a filtering medium, means for producing a vacuum in said compartment, an air-cylinder communicating with said compartment and containing a movable piston, said piston operating a valve for admitting compressed air to said compartment.

13. A rotary separator comprising in combination, compartments covered with a filtering medium, means for obtaining a condition of vacuum in said compartments, air-cylinders attached to said filter and communicating with said compartments, and containing movable pistons, a stationary compressed air valve, and means whereby said pistons operate said valve thereby determining the admission of compressed air to each of said compartments.

14. A rotary separator comprising compartments wherein compressed air is admitted alternately with vacuum, means for predetermining the time of such alternation according to the degree of vacuum in a reservoir, and means for regulating the degree of vacuum in said reservoir substantially as described.

In testimony whereof I have signed my name in this specification in the presence of two subscribing witnesses.

ASKIN MORRISON NICHOLAS.

Witnesses:
 ALICE HARKER,
 FLORENCE SINCLAIR.